G. R. EVANS.
ROTARY ENGINE.
APPLICATION FILED NOV. 3, 1909.

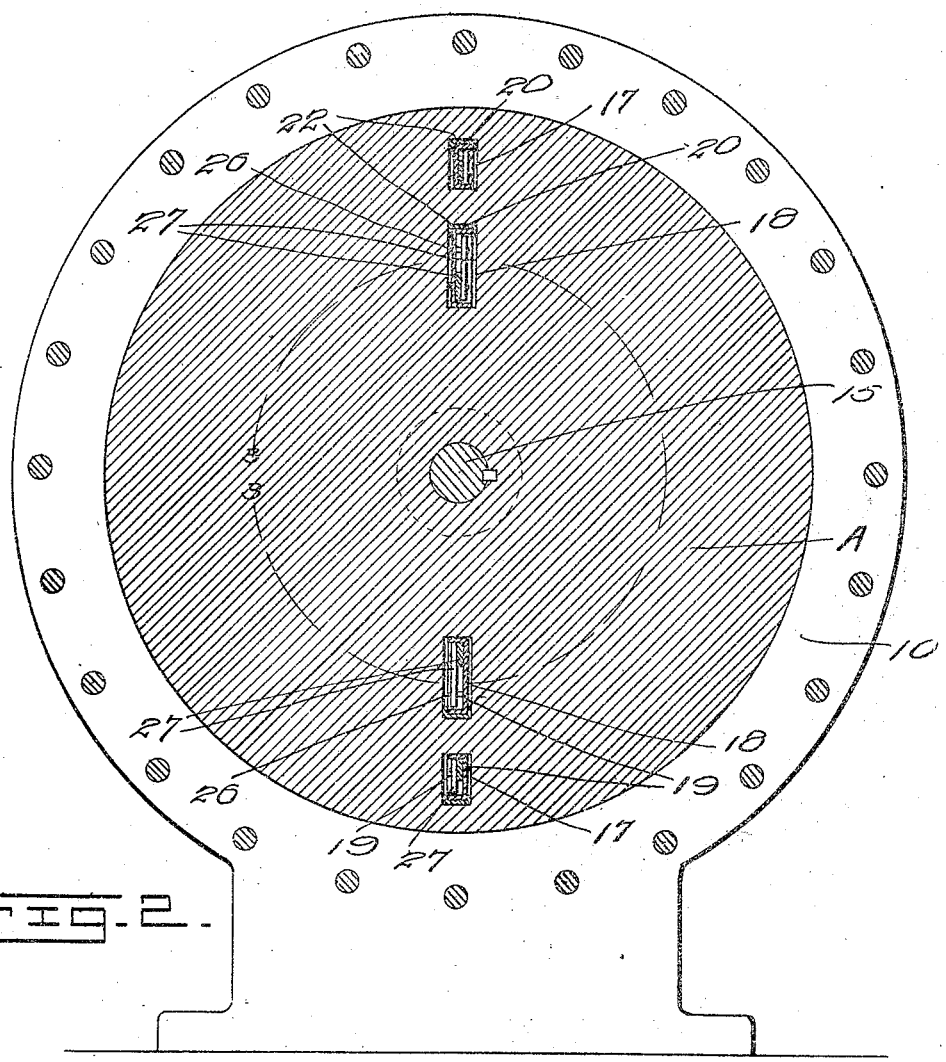
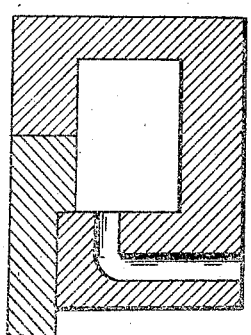

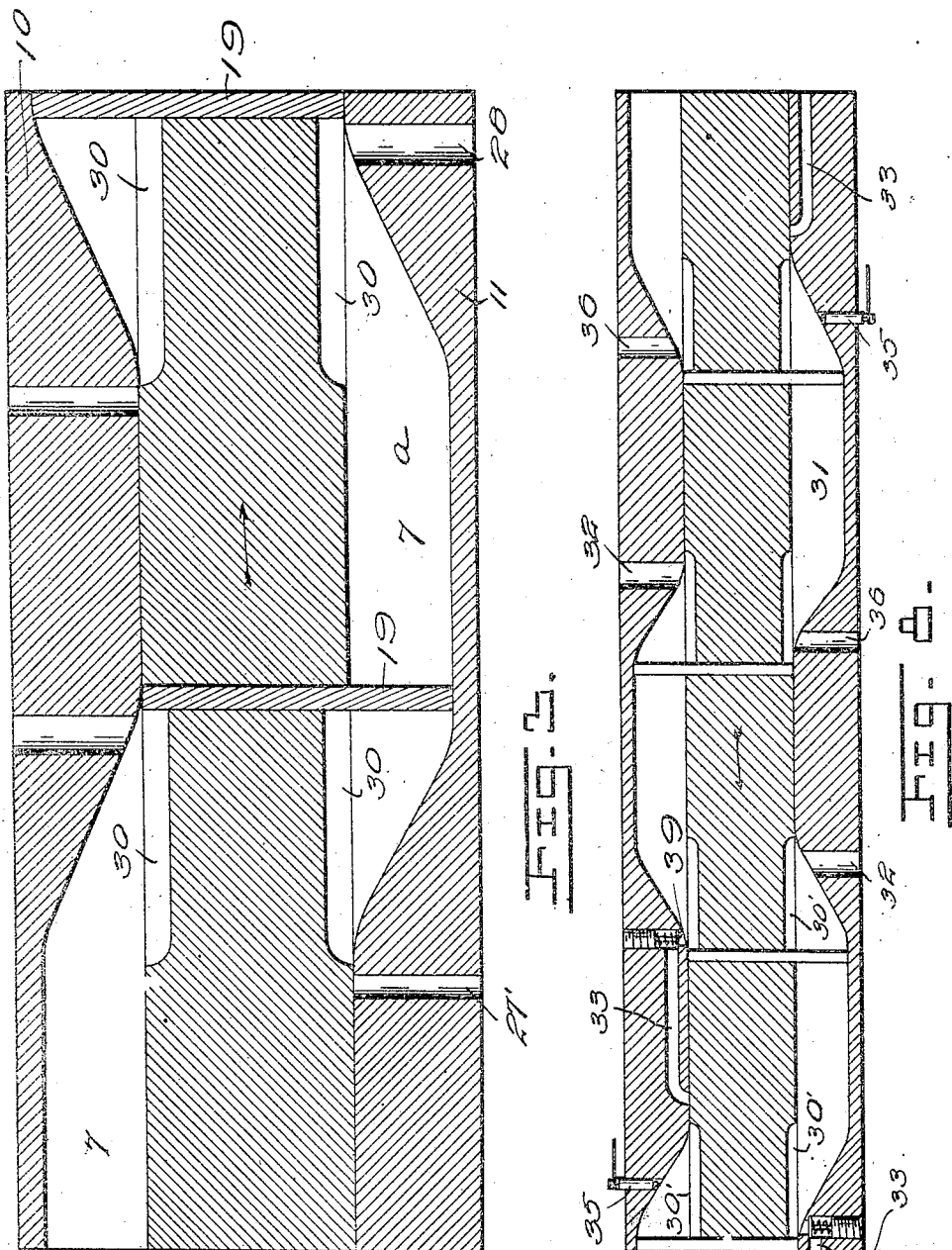

969,353.

Patented Sept. 6, 1910.

6 SHEETS—SHEET 4.

Witnesses

Inventor
G. R. Evans,
By Woodward & Chandlee
Attorneys

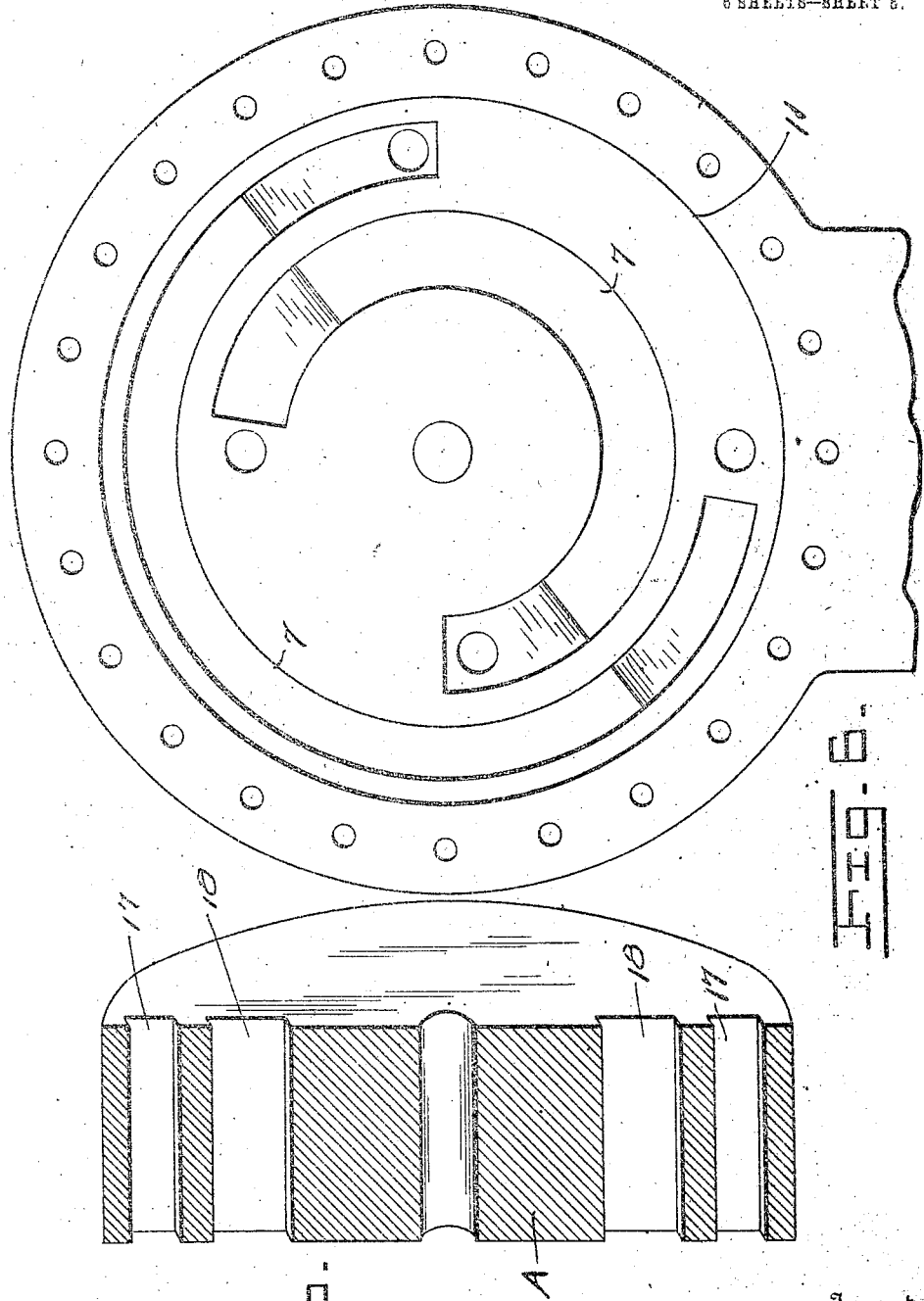

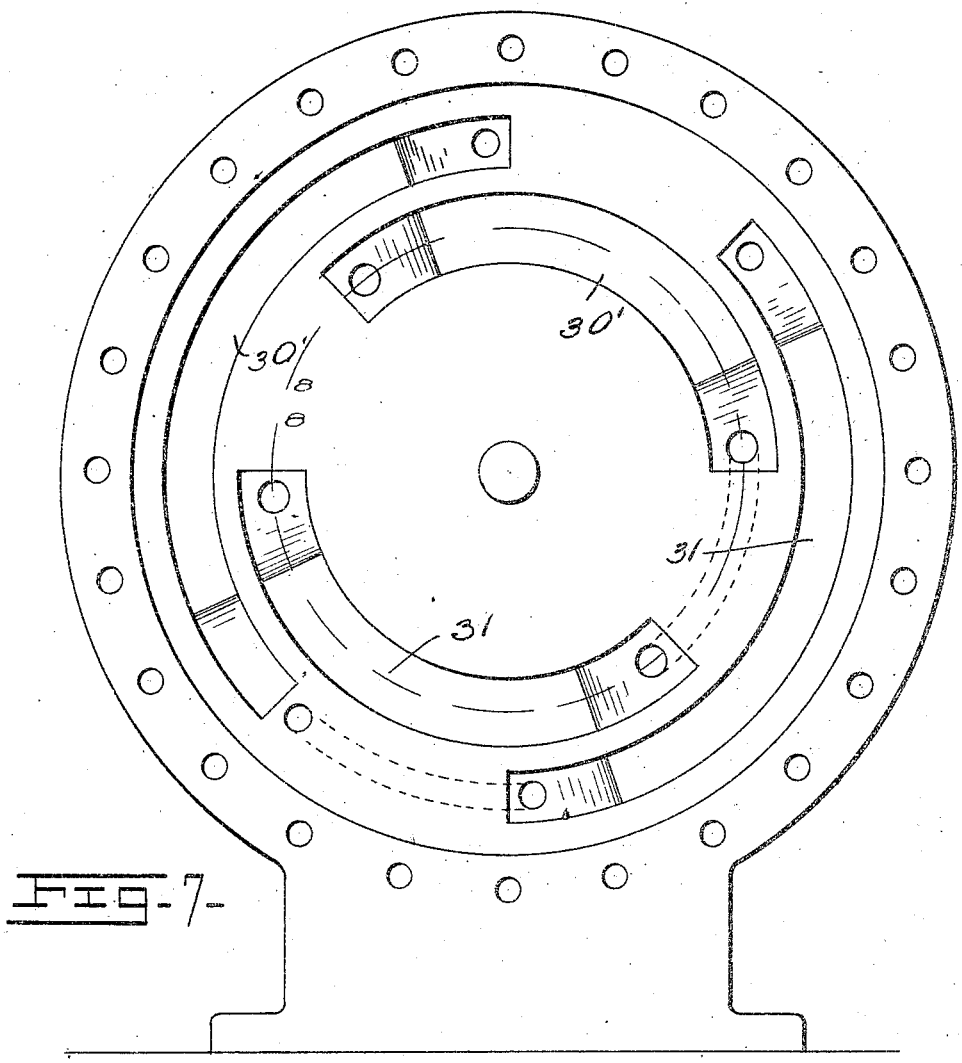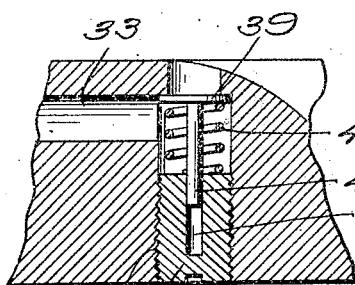

UNITED STATES PATENT OFFICE.

GEORGE R. EVANS, OF BERKELEY, CALIFORNIA.

ROTARY ENGINE.

969,353.   Specification of Letters Patent.   Patented Sept. 6, 1910.

Application filed November 3, 1909. Serial No. 526,077.

*To all whom it may concern:*

Be it known that I, GEORGE R. EVANS, a citizen of the United States, residing at Berkeley, in the county of Alameda and State of California, have invented certain new and useful Improvements in Rotary Engines, of which the following is a specification.

This invention relates to rotary engines, and more particularly to that type employing rotors having longitudinally sliding pistons against which the pressure of a fluid power medium is directed.

A very important object of the invention is to provide such a device utilizing to a maximum degree the expansive quality of steam, the same detail of construction attaining this end being also calculated to make the device valuable when adapted for use as a hydrocarbon engine.

Another important object of the device is to provide a means for utilizing a compressed fluid at successive stages in the course of its expansion.

Another object is to provide a novel form of bearing adjustment for the longitudinally sliding pistons of the rotor adapted to maintain a maximum efficiency in the compression of the engine.

Other objects and advantages will be apparent from the following description, and it will be understood that changes in the specific structure shown and described may be made within the scope of the claims without departing from the spirit of the invention.

Figure 1:
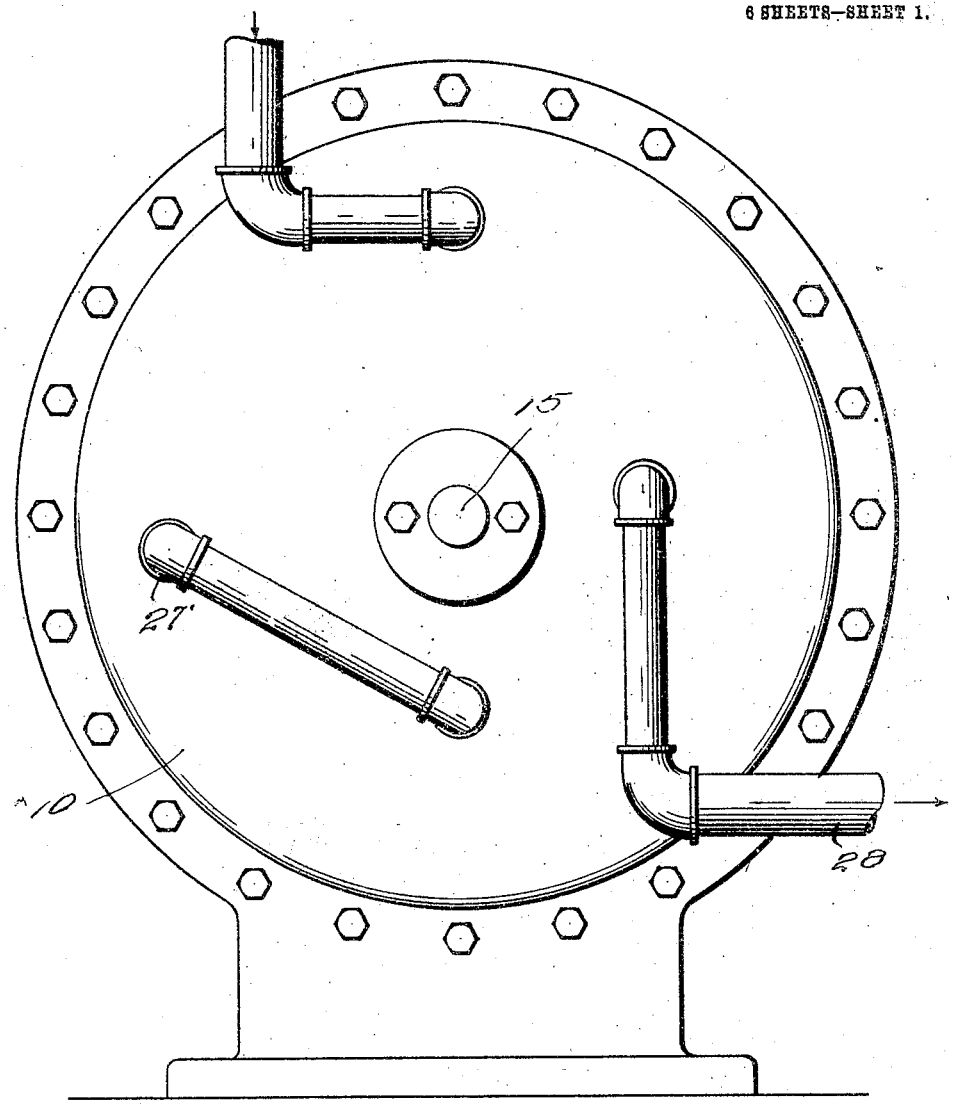
Figure 4:
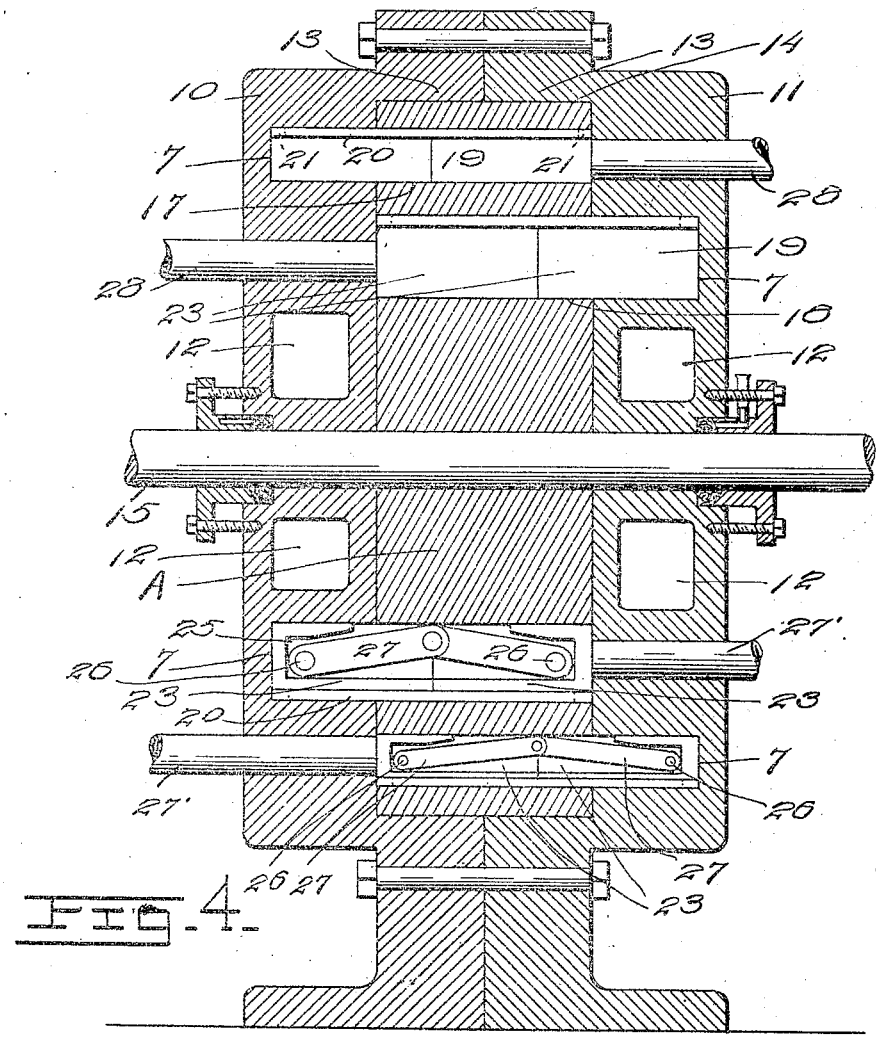
Figure 11:
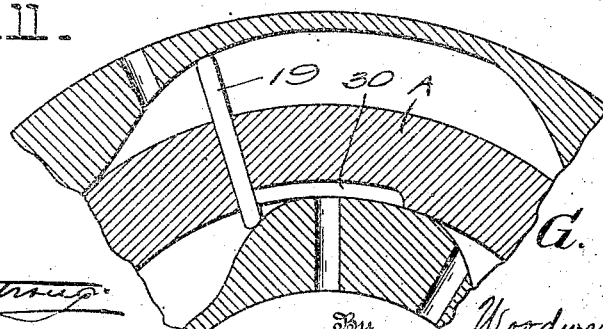

In the drawings forming a portion of this specification, and in which like numerals of reference indicate similar parts in the several views, Figure 1 is a side view of the engine showing the proper inlet and exhaust connections therefor, Fig. 2 is a central vertical section in the major plane of the machine, Fig. 3 is a cross sectional development on the circle 3—3 of Fig. 2, Fig. 4 is a vertical section on the line 4—4 of Fig. 2, Fig. 5 is a vertical sectional view of the rotor thrown in perspective, Fig. 6 is an inner view of one side of the casing, Fig. 7 is a side elevation of the device adapted for use as a hydro-carbon engine with one side of the casing removed, Fig. 8 is a view similar to Fig. 3 on the line 8—8 of Fig. 7, Fig. 9 is a detail sectional view of a bypass in the gas engine. Fig. 10 is a fragmentary section of a modified form of casing and rotor, Fig. 11 is a section of the same, at right angles to that shown in Fig. 10.

Referring to the drawings, there is shown an engine comprising a circular casing comprising the cylinder heads 10 and 11, which as shown are considerably thickened and may be provided with water-cooling passages 12, as illustrated in Fig. 1 in dotted lines, when it is adapted for use as a gas engine. The members 10 and 11 may be called heads, and have annular flanges 13 extending laterally inward and meeting to form a circular chamber 14 as shown. The flanges extend radially of the casing thus formed, and have coengaged therethrough suitable bolts by which the opposite sides are held in proper coengagement.

Engaged revolubly through the members 10 and 11, there is a suitably journaled shaft 15 to which there is suitably splined or otherwise secured the rotor A, which fits snugly against the opposed inner faces of the members 10 and 11, and against the inner peripheral surfaces of the coengaged flanges 13, as shown.

On their inner faces the members 10 and 11 are provided with concentrically arranged series of recesses or grooves 7, the opposed grooves in the respective sides of the casing being arranged in staggered relation. The ends of the grooves slope gradually outward to the plane surface of the members 10 and 11, and the ends of opposed grooves overlap to the length of these inclined portions. These grooves provide in effect a tortuous annular channel extending concentrically of the casing, the form of which is clearly illustrated in Fig. 3. It will be noted that the plane surface of the sides between the ends of the grooves is of a length common to that of the bottom of the opposed grooves.

The rotor A is provided with a series of concentrically arranged transverse passages 17 and 18, in which there are slidably disposed the pistons 19 which exceed in length the thickness of the rotor by the distance represented by the depth of the grooves 7 and are arranged to project into these grooves and engage snugly against their sides, and bottoms or inclined ends as illustrated in the drawings. It will be seen that upon rotation of the rotor the pistons will engage alternately with the inclined ends of the opposed grooves 7 to be forced from one side to the other of the casing and projected into these grooves alternately. These pistons may be formed in any suitable manner, one method of construction being illustrated and comprising the central body member 20 extending transversely of the engine, said members being bifurcated at their extremities as shown at 21, and being provided with the angular channel 22 on the under sides. The member 20 is superimposed upon two oppositely slidable members 23 which are engaged snugly in the channel 22 and are provided with an upwardly extending portion 24 engaged in the bifurcation 21. The members 23 are recessed as shown at 25, and have disposed in the said recesses and adjacent the outer ends of the members 23 the pivot pins 26 to which are connected the longitudinally disposed link members 27 disposed at an obtuse angle with relation to each other and extending at their inner ends away from the member 20 and being pivotally coengaged thereat.

In use, the pistons are intended to be engaged in the passages 17 and 18 with the member 20 disposed radially outward, so that under rotative movement of the rotor, centrifugal force acting upon the links 27 will cause them to press outwardly upon the members 23 forcing them snugly into engagement with the ends of the recesses 7.

Suitable inlet ports 27' are formed in each of the sides of the casing, and opening through the plane inner face thereof closely adjacent and concentric with one end of the recesses 7. Suitable exhaust ports are formed at the opposite ends of these grooves, adjacent the upper ends of their inclined faces, and numbered 28.

The outer series of pistons 19 are intended to be acted upon by fresh live steam, and the inner series, operating in grooves which are larger, may be acted upon by the exhaust from the outer set, and thus the full expansive effect of the steam be converted into energy as far as practicable. It will be understood that additional concentric series of grooves and pistons similar to those above described may be disposed inwardly or outwardly of the grooves described in order to use the steam at as many successive stages in its expansion as may be desired. It will also be understood, however, that if desired direct boiler connections may be made to the inlet ports of each of the recesses if desired.

Extending from one side of each of the passages 17 and 18 in a common direction concentrically of the rotor, there are shallow by-pass grooves 30, arranged to register with the ports 27' at times.

Thus it will be seen that upon admission of steam through the ports 27', the rotor being previously disposed in position with one of the grooves 30 registering with the port 27', one of the pistons 19 will be in position to receive the force of the steam, which bearing thereagainst will rotate the rotor. It will be seen that after a short period of movement the ends of the grooves 30 will pass the ports 27', cutting off the supply of steam, and the steam already admitted to the adjacent recess before the closing of the port 27, as indicated by the letter a in Fig. 3, will continue to act by the energy of its expansion forcing the piston 19 to the opposite end of the groove where it is guided to the opposite side of the casing to receive a fresh impulse upon that side, and uncovering the port 28 in the first groove, allowing the exhaust of steam therethrough upon the entrance of the following piston to the same groove.

In escaping, the steam may be either carried to the inlet ports of the inner series of grooves, or may be condensed or allowed to escape in any other manner desirable.

In adapting the device to use as a gas engine, the construction of the rotor is approximately the same as above described, with the difference that a larger number of pistons are carried thereby, made possible by the fact that a larger number of grooves or recesses are required in the casing in order to provide separate chambers for the compression of the gas and its explosion. Thus, while in the first form but one recess was formed on each side of the casing in the respective concentric series, in the gas engine two such recesses are formed in each side in respective series. In the gas engine as illustrated in the Figs. 7, 8 and 9, it will be observed that pairs of concentrically arranged recesses 30 and 31 are formed in opposite sides of the casing, the recess 30 comprising the compression chamber, and having an inlet passage 32 opening through its inclined face at one end and arranged to conduct gas from a suitable source, while from the other end a by-pass 33 opens from the outer end of the inclined face of the recess and extends through the side of the casing to a point adjacent the proximal end of the next recess, where it opens through the inner face of the casing a spaced distance from the recess 31, which may be called the explosion chamber. The by-pass is arranged to be closed in a manner similar to the steam ports in the first described form of the invention, and the passage of gas therefrom into the explosion chamber is permitted in approximately the same manner as the steam is admitted in the first described form. The explosion chambers 31 are provided intermediately of their inclined faces adjacent the by-pass with a suitable spark plug 35 set in such a manner as not to interfere with the movement of the pistons and at their opposite ends are provided with the exhaust ports 36.

When the device is used, rotation of the rotor will carry one of the pistons through the compression chamber, drawing in a charge of fresh gas through the port 32 as will be readily understood, and the next piston following will compress this charge, forcing it into the by-pass 33 in which it will be considerably compressed before the groove 30' of the rotor immediately proceeding comes into registry with the exit opening of the by-pass 33 to allow the charge to enter the explosion chamber. Thus it will be seen that the charge will be admitted to the explosion chamber under compression at approximately half its volume under atmospheric pressure. Suitable means may be connected with the engine for operating a commutator to send sufficient electrical impulse through the spark plug to cause the spark or ignition of the charge, such a mechanism being of familiar construction to those versed in this art, and is therefore not illustrated in the present application. The spark should be timed to occur immediately after the groove 30' passes beyond the outlet of the by-pass 33, the ensuing explosion serving to force the engaged piston to the opposite end of the chamber 31, as will be understood.

In the gasolene engine, in order to produce a more even impulse to the rotor, it may be found desirable to space the inner and outer series of chambers in staggered relation, and it will also be understood that as many concentric series of chambers and pistons may be installed as desired. When intended for use as a gasolene engine, the casing may be provided with water circulating passages 12, as indicated in dotted lines in Figs. 2 and 4.

It will be seen from the foregoing that the present invention provides a novel form of gas engine, and particularly a novel form of rotor for engines of this type, in combination with a novel arrangement of the inlet ports which has a peculiar function both in the steam engine and the gasolene engine in adding to the effectiveness of its operation.

In Fig. 9 there is illustrated a detail of the by-pass in the gasolene engine. Opening through the outer face of each side of the casing, there is an enlarged threaded passage 38 intersecting the by-pass channel 33 adjacent its intake end, and forming at the point of intersection a valve seat receiving thereon a spring pressed valve 39 having a stem 41 engaged slidably in a suitable guiding recess 42 formed in a threaded block 44 securely engaged in the opening from the outside. Thus when the gas or mixture is forced past the valve under compression, it will be retained securely therein after the piston has passed over the inlet opening, until sufficient pressure is produced by the following piston to overcome the pressure within the by-pass and the force of the spring 45, seated upon the block 44 and bearing against the valve as shown.

The compression chambers may be made larger than the explosion chambers if found practicable, to supply a greater quantity of explosive fluid to the ignited. It will also be understood that the casing and rotor may be modified so that the pistons will operate radially, a sufficient detail of which is illustrated in Figs. 10 and 11. The first of these views is a segmental section in the central plane of the modified device, and the second a fragmentary cross section. Similar numerals are applied to the elements equivalent to those first described.

What is claimed is:

1. A device of the class described comprising a casing having a plurality of concentric opposed series of compression and expansion recesses formed therein and having inlet ports communicating with one end of each of the compression recesses, the compression and expansion recesses being arranged in alternate relation, like recesses on opposite sides of the casing being arranged in staggered relation, said casing having passages formed therein opening from the compression recesses oppositely of the inlet ports and opening through the face of the casing a spaced distance from the ends of the adjacent expansion recesses, said casing having also exhaust passages opening from the ends of the expansion recesses oppositely of said passages, a rotor carried within the casing and having surfaces abutting slidably against the sides of the casing to close said recesses, said rotor having a plurality of passages therethrough, pistons slidable in the passages and adapted for reciprocation for alternate projection into the opposed recesses, concentric segmental grooves formed in the sides of the rotor and adapted to register at times with the outlets of said passages and the adjacent ends of proximal expansion recesses, and igniting means engaged in said recesses adjacent the passages.

2. A device of the class described comprising a casing having a plurality of concentric opposed series of compression and expansion recesses formed therein, and having inlet ports communicating with one end of each of the compression recesses, the compression and expansion recesses being arranged in alternate relation, a rotor mounted within the casing having surfaces abutting slidably against the sides of the casing to close said recesses, said rotor having a plurality of passages therethrough, pistons slidable in the passages and adapted for reciprocation for alternate projection into the opposed recesses, said pistons comprising channel members and links pivotally connected together and to the channel members, said pistons adapted to be forced laterally into the said recesses by centrifugal force acting on the links in the rotation of said rotor.

In testimony whereof I affix my signature, in presence of two witnesses.

GEORGE R. EVANS.

Witnesses:
GEO. L. BRUNS,
G. E. BAILEY.